US010363829B2

(12) United States Patent
Etzelsberger et al.

(10) Patent No.: US 10,363,829 B2
(45) Date of Patent: Jul. 30, 2019

(54) PORTABLE AND CONVERTIBLE RECHARGEABLE BATTERY POWER SUPPLY

(71) Applicant: URBAN626, LLC, Pasadena, CA (US)

(72) Inventors: Sven Etzelsberger, Pasadena, CA (US); Grant Delgatty, Pasadena, CA (US); Peter Lee, Pasadena, CA (US)

(73) Assignee: URBAN626, LLC, Pasadena, CA (US)

( * ) Notice: Subject to any disclaimer, the term of this patent is extended or adjusted under 35 U.S.C. 154(b) by 101 days.

(21) Appl. No.: 15/711,823

(22) Filed: Sep. 21, 2017

(65) Prior Publication Data

US 2018/0079319 A1    Mar. 22, 2018

Related U.S. Application Data

(60) Provisional application No. 62/397,857, filed on Sep. 21, 2016.

(51) Int. Cl.
*B60L 11/18* (2006.01)
*H02J 7/00* (2006.01)
(Continued)

(52) U.S. Cl.
CPC .......... *B60L 11/1877* (2013.01); *B60L 1/006* (2013.01); *B60L 50/64* (2019.02); *B60L 50/66* (2019.02);
(Continued)

(58) Field of Classification Search
CPC ...... B60L 11/1877; B60L 50/64; B60L 50/66; B60L 53/80; B60L 1/006; B60L 2200/12;
(Continued)

(56) References Cited

U.S. PATENT DOCUMENTS 1,359,329 A    11/1920    Carson
2,135,257 A    11/1938    Manton
(Continued)

FOREIGN PATENT DOCUMENTS

CN    2078727 U    6/1991
CN    2094497 U    1/1992
(Continued)

OTHER PUBLICATIONS

Extended European Search Report for European Application No. 14843829.4, Search completed Mar. 9, 2017, dated Mar. 16, 2017, 10 Pgs.
(Continued)

*Primary Examiner* — Robert L Deberadinis
(74) *Attorney, Agent, or Firm* — KPPB LLP

(57) ABSTRACT

Portable convertible rechargeable battery power supplies are described. The battery power supplies generally comprise a casing enclosing one or more battery power cells and associated electronics and electrical interconnections. The power cells are interconnected with a plurality of external ports allowing for at least one recharge input and at least two outputs: one configured for use with an electronic apparatus, such as a vehicle, and at least one configured for use with one or more personal electronic devices. The apparatus may be an electric vehicle, and the battery power supply may be configured to be secured within the electric vehicle. The outputs for the personal electronic devices may include any suitable port, such as, for example, USB, mini-USB, USB-c, lightning, etc.

20 Claims, 11 Drawing Sheets

(51) Int. Cl.
*H01R 24/60* (2011.01)
*B60L 1/00* (2006.01)
*B60L 53/80* (2019.01)
*B60L 50/60* (2019.01)
*B60L 50/64* (2019.01)

(52) U.S. Cl.
CPC .............. *B60L 53/80* (2019.02); *H01R 24/60* (2013.01); *H02J 7/0045* (2013.01); *B60L 2200/12* (2013.01); *Y02T 10/7005* (2013.01); *Y02T 10/705* (2013.01); *Y02T 10/7072* (2013.01); *Y02T 90/124* (2013.01); *Y02T 90/14* (2013.01)

(58) Field of Classification Search
CPC .... H01R 24/60; H02J 7/0045; Y02T 10/7005; Y02T 10/705; Y02T 90/124; Y02T 90/14
See application file for complete search history.

(56) References Cited

U.S. PATENT DOCUMENTS

| | | |
|---|---|---|
| 3,486,765 A | 12/1969 | Turner |
| 3,695,496 A | 10/1972 | Humlong |
| 4,067,589 A | 1/1978 | Hon |
| 4,202,561 A | 5/1980 | Yonkers |
| 4,282,993 A | 8/1981 | Humlong |
| 4,598,923 A | 7/1986 | Csizmadia et al. |
| 4,653,767 A | 3/1987 | Gajewski |
| D331,906 S | 12/1992 | Mohri |
| D337,984 S | 8/1993 | Lindahl |
| D338,433 S | 8/1993 | Crooks, Sr. |
| 5,741,305 A | 4/1998 | Vincent et al. |
| D401,190 S | 11/1998 | Krause |
| D454,814 S | 3/2002 | Ou |
| 6,367,832 B1 | 4/2002 | Vogel |
| D457,197 S | 5/2002 | Becker |
| D464,379 S | 10/2002 | Lin |
| D466,839 S | 12/2002 | Ou |
| D476,618 S | 7/2003 | Wong et al. |
| 6,588,787 B2 | 7/2003 | Ou |
| D483,821 S | 12/2003 | Yang |
| D487,908 S | 3/2004 | Mayer et al. |
| D503,362 S | 3/2005 | Zhu et al. |
| 6,877,756 B2 | 4/2005 | Yamabe et al. |
| D511,719 S | 11/2005 | Chung |
| D513,629 S | 1/2006 | Sramek |
| D513,772 S | 1/2006 | Otis et al. |
| 6,986,522 B2 | 1/2006 | Sinclair et al. |
| D522,076 S | 5/2006 | Casey |
| D526,938 S | 8/2006 | Nagel |
| D530,650 S | 10/2006 | Azuma et al. |
| D544,462 S | 6/2007 | Patel |
| D546,277 S | 7/2007 | Andre et al. |
| D556,647 S | 12/2007 | Yamagishi |
| D561,651 S | 2/2008 | Yamagishi |
| D576,920 S | 9/2008 | Yang |
| D578,935 S | 10/2008 | Yang |
| D584,224 S | 1/2009 | Mori et al. |
| D586,265 S | 2/2009 | Lin et al. |
| D590,751 S | 4/2009 | Yang |
| D608,255 S | 1/2010 | Arnell |
| D641,667 S | 7/2011 | Ryan et al. |
| D650,724 S | 12/2011 | Chiang |
| D654,403 S | 2/2012 | Kyu |
| D654,852 S | 2/2012 | Hansen |
| 8,146,694 B2 | 4/2012 | Hamidi |
| D668,586 S | 10/2012 | Golias et al. |
| 8,376,383 B1 | 2/2013 | Lee |
| D680,062 S | 4/2013 | Lien |
| D689,019 S | 9/2013 | Sato et al. |
| D695,156 S | 12/2013 | Jessie et al. |
| D726,592 S | 4/2015 | Zhang |
| D735,812 S | 8/2015 | Delgatty |
| D735,813 S | 8/2015 | Delgatty |
| D743,887 S | 11/2015 | Dasbach |
| 9,205,889 B2 | 12/2015 | Paick |
| D746,924 S | 1/2016 | Delgatty |
| 9,227,687 B2 | 1/2016 | Delgatty et al. |
| D750,711 S | 3/2016 | Delgatty |
| 9,283,848 B2 | 3/2016 | Parienti |
| D767,469 S | 9/2016 | Liu |
| 9,440,699 B1 | 9/2016 | Wittorf et al. |
| D774,979 S | 12/2016 | Delgatty et al. |
| D777,606 S | 1/2017 | Dai et al. |
| D786,740 S | 5/2017 | Abe et al. |
| D788,698 S | 6/2017 | Lin |
| 9,694,868 B2 | 7/2017 | Delgatty et al. |
| D804,364 S | 12/2017 | Xianqiang et al. |
| 9,873,476 B2 | 1/2018 | Etzelsberger et al. |
| D820,201 S | 6/2018 | Delgatty et al. |
| D827,035 S | 8/2018 | Delgatty et al. |
| D832,150 S | 10/2018 | Etzelsberger et al. |
| 2001/0000394 A1 | 4/2001 | Whittaker |
| 2002/0140245 A1 | 10/2002 | Coleman, II et al. |
| 2003/0051934 A1 | 3/2003 | Ou et al. |
| 2004/0026147 A1 | 2/2004 | Kao et al. |
| 2005/0035570 A1 | 2/2005 | Chu |
| 2006/0243507 A1 | 11/2006 | Huber |
| 2006/0244418 A1 | 11/2006 | Liao et al. |
| 2007/0258758 A1 | 11/2007 | Ho |
| 2008/0061528 A1 | 3/2008 | Musabi et al. |
| 2008/0217085 A1 | 9/2008 | Wernli et al. |
| 2008/0224441 A1 | 9/2008 | Lu |
| 2009/0020350 A1 | 1/2009 | Wu |
| 2009/0240858 A1 | 9/2009 | Takebayashi et al. |
| 2009/0289434 A1 | 11/2009 | Lin |
| 2010/0006721 A1 | 1/2010 | Lien |
| 2010/0224662 A1 | 9/2010 | Crum et al. |
| 2010/0291418 A1 | 11/2010 | Zhou et al. |
| 2010/0295264 A1 | 11/2010 | Denais |
| 2010/0320717 A1 | 12/2010 | Huang |
| 2011/0193313 A1 | 8/2011 | Yun |
| 2012/0009804 A1 | 1/2012 | Heichal et al. |
| 2012/0043148 A1 | 2/2012 | Brady et al. |
| 2012/0094162 A1 | 4/2012 | Gyenes |
| 2012/0152993 A1 | 6/2012 | Chen |
| 2012/0273287 A1 | 11/2012 | Song et al. |
| 2013/0043826 A1 | 2/2013 | Workman et al. |
| 2014/0225348 A1 | 8/2014 | Wu |
| 2014/0326525 A1 | 11/2014 | Doerksen |
| 2015/0068828 A1 | 3/2015 | Delgatty et al. |
| 2015/0209205 A1 | 7/2015 | Ransenberg |
| 2015/0321722 A1 | 11/2015 | Dadoosh et al. |
| 2016/0009255 A1 | 1/2016 | Droste |
| 2016/0083039 A1 | 3/2016 | Delgatty et al. |
| 2016/0347397 A1 | 12/2016 | Etzelsberger et al. |
| 2017/0259871 A1 | 9/2017 | Delgatty et al. |
| 2018/0015978 A1 | 1/2018 | Delgatty et al. |
| 2018/0022412 A1 | 1/2018 | Etzelsberger et al. |
| 2018/0099722 A1 | 4/2018 | Etzelsberger et al. |

FOREIGN PATENT DOCUMENTS

| | | |
|---|---|---|
| CN | 2095153 U | 2/1992 |
| CN | 2120052 U | 10/1992 |
| CN | 2125542 U | 12/1992 |
| CN | 2145148 Y | 11/1993 |
| CN | 1086775 A | 5/1994 |
| CN | 2178674 Y | 10/1994 |
| CN | 2194325 Y | 4/1995 |
| CN | 2214343 Y | 12/1995 |
| CN | 2217560 Y | 1/1996 |
| CN | 2270004 Y | 12/1997 |
| CN | 2280042 Y | 4/1998 |
| CN | 2350284 Y | 11/1999 |
| CN | 2444866 Y | 8/2001 |
| CN | 2446039 Y | 9/2001 |
| CN | 3232356 | 4/2002 |
| CN | 2598831 Y | 1/2004 |
| CN | 2609827 Y | 4/2004 |
| CN | 3346886 | 4/2004 |
| CN | 2623589 Y | 7/2004 |
| CN | 3377320 | 7/2004 |

(56) References Cited

FOREIGN PATENT DOCUMENTS

| | | |
|---|---|---|
| CN | 2644281 Y | 9/2004 |
| CN | 2711022 Y | 7/2005 |
| CN | 2721500 Y | 8/2005 |
| CN | 2758196 Y | 2/2006 |
| CN | 200957871 Y | 10/2007 |
| CN | 200992276 Y | 12/2007 |
| CN | 201016020 Y | 2/2008 |
| CN | 300832206 | 9/2008 |
| CN | 201442629 U | 4/2010 |
| CN | 101708758 A | 5/2010 |
| CN | 201447025 U | 5/2010 |
| CN | 201647016 U | 11/2010 |
| CN | 201849580 U | 6/2011 |
| CN | 201849584 U | 6/2011 |
| CN | 101804839 B | 12/2011 |
| CN | 202186467 U | 4/2012 |
| CN | 202320664 U | 7/2012 |
| CN | 202491886 U | 10/2012 |
| CN | 202624536 U | 12/2012 |
| CN | 302232853 S | 12/2012 |
| CN | 202703785 U | 1/2013 |
| CN | 202863671 U | 4/2013 |
| CN | 103072658 A | 5/2013 |
| CN | 103171719 A | 6/2013 |
| CN | 203268251 U | 11/2013 |
| CN | 302709415 S | 1/2014 |
| CN | 103600798 A | 2/2014 |
| CN | 302729747 S | 2/2014 |
| CN | 104290843 A | 1/2015 |
| CN | 204137242 U | 2/2015 |
| CN | 303101631 S | 2/2015 |
| CN | 204399396 U | 6/2015 |
| CN | 204567915 U | 8/2015 |
| CN | 104875828 A | 9/2015 |
| CN | 204606081 U | 9/2015 |
| CN | 204801982 U | 11/2015 |
| CN | 105151197 A | 12/2015 |
| CN | 204846216 U | 12/2015 |
| CN | 205010403 U | 2/2016 |
| CN | 205010404 U | 2/2016 |
| CN | 105416481 A | 3/2016 |
| CN | 105501369 A | 4/2016 |
| CN | 205186428 U | 4/2016 |
| CN | 205186430 U | 4/2016 |
| CN | 105539680 A | 5/2016 |
| CN | 105539688 A | 5/2016 |
| CN | 105539691 A | 5/2016 |
| CN | 205220935 U | 5/2016 |
| CN | 105722752 A | 6/2016 |
| CN | 205396364 U | 7/2016 |
| CN | 205469551 U | 8/2016 |
| CN | 205469567 U | 8/2016 |
| CN | 205554440 U | 9/2016 |
| CN | 205602020 U | 9/2016 |
| CN | 106043555 A | 10/2016 |
| CN | 205737898 U | 11/2016 |
| CN | 205819446 U | 12/2016 |
| CN | 106965898 A | 7/2017 |
| CN | 103723227 B | 9/2017 |
| CN | 304380162 S | 12/2017 |
| CN | 304466558 S | 1/2018 |
| DE | 19516763 A1 | 11/1996 |
| EP | 3063056 A1 | 9/2016 |
| EP | 3063056 B1 | 8/2018 |
| FR | 1249891 A | 1/1961 |
| FR | 2816265 A1 | 5/2002 |
| FR | 2844248 A1 | 3/2004 |
| GB | 2106450 B | 3/1985 |
| GB | 2379641 A | 3/2003 |
| GB | 2427392 B | 7/2007 |
| JP | 04358984 A | 12/1992 |
| JP | 06329068 A | 11/1994 |
| JP | 07052857 A | 2/1995 |
| JP | 1155291 | 10/2002 |
| KR | 200339371 Y1 | 1/2004 |
| KR | 30358808 | 8/2004 |
| WO | 9801334 A1 | 1/1998 |
| WO | 2011098887 A1 | 8/2011 |
| WO | 2011099717 A2 | 8/2011 |
| WO | 2015038674 A1 | 3/2015 |
| WO | 2016045318 A1 | 3/2016 |
| WO | 2016196510 | 12/2016 |
| WO | 2017017067 A1 | 2/2017 |
| WO | 2017177677 A1 | 10/2017 |
| WO | 2018017898 A1 | 1/2018 |
| WO | 2018057767 A1 | 3/2018 |

OTHER PUBLICATIONS

International Preliminary Report on Patentability for International Application PCT/US2014/055033, Report issued Mar. 15, 2016, dated Mar. 24, 2016, 5 Pgs.

International Search Report and Written Opinion for International Application No. PCT/US2016/035093, Search completed Jul. 26, 2016, dated Aug. 25, 2016, 8 Pgs.

International Search Report and Written Opinion for International Application No. PCT/US2017/052763, Search completed Nov. 13, 2017, dated Nov. 29, 2017, 11 Pgs.

International Search Report and Written Opinion for International Application PCT/US2014/055033, Report Completed Nov. 16, 2014, dated Dec. 19, 2014.

"ILY-A", ARS Electronica 2015, Sep. 7, 2015, Retrieved from the Internet URL:http://www.aec.at/postcity/en/ily-a/ on Jul. 8, 2016.

Crook, "Urb-E, The Fold-Up Electric Scooter, Goes Live on Indiegogo", Feb. 10, 2014, URL: https://techcrunch.com/2014/02/10/urb-e-the-fold-up-electric-scooter-goes-live-on-indiegogo/ on Apr. 30, 2017.

Mok, Kimberley, "Halfbike: Upright simplified bike combines biking with jogging (Video)", Tree Hugger, Mar. 21, 2014, Retrieved from the Internet URL: http://www.treehugger.com/bikes/halfbike-kolelinia-upright-simplified-bike-combines-biking-with-jogging.html on Jul. 8, 2016.

Prigg, "Is this the future of commuting? Worlds smallest e-vehicle revealed—and it is controlled by an app", Daily Mail, Feb. 25, 2014, Retrieved from the Internet URL: http://www.dailymail.co.uk/sciencetech/article-2567972/Is-future-commuting-Worlds-smallest-e-vehicle-revealed-controlled-app.html retrieved on Jul. 8, 2016.

Seth, Radhika, "Get a Jiffy Ride", YD—Yanko Design.,Feb. 9, 2010, Retrieved from the Internet URL: http://www.yankodesign.com/2010/02/09/get-a-jiffy-ride/ on Jul. 8, 2016.

Chinese Design No. 201330204981.8, filed May 24, 2013, Published Jan. 8, 2014 as 302709415.

Chinese Design No. 201430564490.9, filed Dec. 31, 2014, Published May 6, 2015 as 303197333.

Chinese Design No. 201530021961.6, filed Jan. 21, 2015, Published Oct. 7, 2015 as 303403049.

Chinese Design No. 201530049360.6, filed Feb. 26, 2015, Published Jul. 29, 2015 as 303307665.

Chinese Design No. 201530345978.7, filed Sep. 9, 2015, Published Dec. 23, 2015 as 303519704.

Chinese Design No. 201530360131.6, filed Sep. 17, 2015, Published Jan. 6, 2016 as 303541390.

Chinese Design No. 201530374219.3, filed Sep. 25, 2015, Published Jan. 27, 2016 as 303572100.

Chinese Design No. 201530421908.5, filed Oct. 28, 2015, Published Mar. 30, 2016 as 303627516.

Chinese Design No. 201630011386.6, filed Jan. 13, 2016, Published Jun. 22, 2016 as 303718360.

Chinese Design No. 201630299422.3, filed Jul. 2, 2016, Published Oct. 19, 2016 as 303895582.

European Design No. 001890740-0001, filed Jul. 13, 2011, Published Aug. 29, 2011 as 2011/195 A.1.

European Design No. 002318303-0002, filed Sep. 30, 2013, Published Oct. 4, 2013 as 2013/189 A.1.

European Design No. 002549568-0001, filed Oct. 2, 2014, Published Apr. 5, 2017 as 2017/066 A.1.

European Design No. 002804146-0001, filed Sep. 29, 2015, Published Nov. 16, 2015 as 2015/217 A.1.

(56) References Cited

OTHER PUBLICATIONS

International Preliminary Report on Patentability for International Application PCT/US2016/035093, Report issued Dec. 5, 2017, dated Dec. 14, 2017, 7 Pgs.
International Search Report and Written Opinion for International Application No. PCT/US2018/045551, Search completed Oct. 2, 2018, dated Nov. 2, 2018, 13 Pgs.
International Search Report and Written Opinion for International Application No. PCT/US2018/045578, Search completed Oct. 8, 2018, dated Oct. 22, 2018, 15 Pgs.
International Search Report and Written Opinion for International Application No. PCT/US2018/046294, Search completed Oct. 2, 2018, dated Nov. 1, 2018, 15 Pgs.
International Search Report and Written Opinion for International Application No. PCT/US2017/043175, Search completed Sep. 10, 2017, dated Sep. 28, 2017, 14 Pgs.
"7 electric scooters that will change the way you commute", Business Insider, https://www.businessinsider.in/7-electric-scooters-that-will-change-the-way-you-commute/CycleBoard/slideshow/57044040.cms, Feb. 8, 2017, 6 pgs.
"Stigo Scooter User Manual", https://stigobike.com/wp-content/uploads/2017/12/Stigo-manual-EN-1.pdf, 2017, 30 pgs.
"URB-E Sport", URB-E, https://www.urb-e.com/sport/, Jan. 8, 2017, 11 pgs.
"Urb-E Sport GT", Urb-E.com, Jun. 25, 2017.
International Preliminary Report on Patentability for International Application PCT/US2017/052763, Report issued Mar. 26, 2019, dated Apr. 4, 2019, 10 Pgs.

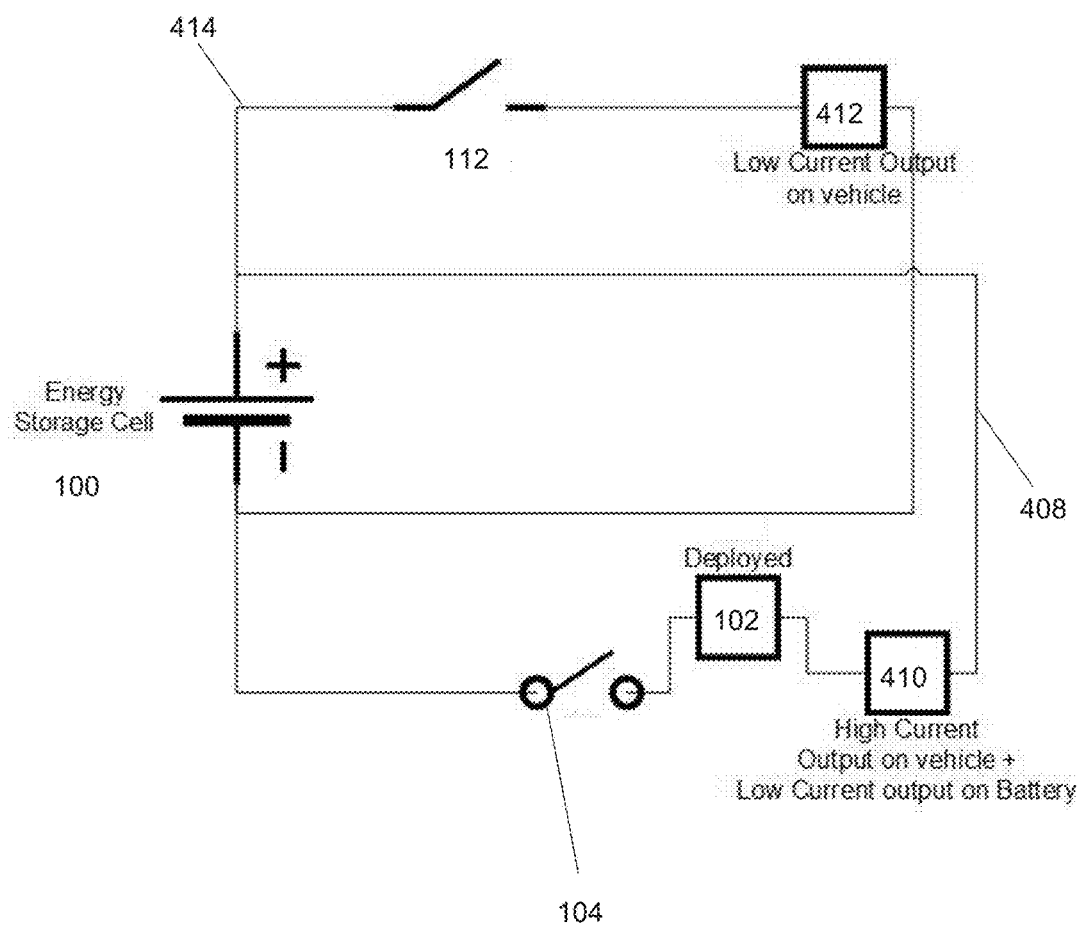

PORTABLE AND CONVERTIBLE RECHARGEABLE BATTERY POWER SUPPLY

CROSS-REFERENCE TO RELATED APPLICATIONS

The present application claims priority to U.S. Provisional Application No. 62/397,857, entitled "Portable and Convertible Rechargeable Battery Power Supply" to Etzelsberger et al., filed Sep. 21, 2016, the disclosure of which is incorporated herein by reference in its entirety.

FIELD OF THE INVENTION

Compact, portable rechargeable battery power supplies as described.

BACKGROUND OF THE INVENTION

A common difficulty encountered in making electric transport vehicles more accessible relies on having a steady supply of power. In particular, having a network of charging stations and/or battery replacements that allow for easy use of electric vehicles without the long recharge times normally required. Similar problems exist for the use of all portable electronics, including portable computers, handheld devices, etc.

Accordingly, a need exists for personal battery supplies and an infrastructure capable of supporting such personal battery supplies.

BRIEF SUMMARY OF THE INVENTION

The application is directed to portable rechargeable battery power supplies

Many embodiments are directed to portable rechargeable battery supplies that may be used in both electric vehicles and for personal use.

In many embodiments, the portable rechargeable battery power supply includes
  a body having an outer shell defining an inner volume having at least one rechargeable energy storage cell disposed therein;
    a mechanical interconnection disposed in the outer shell of the body comprising at least one fixed mechanical engagement point and at least one deployable mechanical locking element;
  a primary power output bus disposed in the outer shell of the body and electronically connected with the at least one rechargeable energy storage cell, the primary power output bus being configured to cooperatively interconnect the portable battery power supply to an external electronic circuit to supply at least one high current output and at least one low current output thereto;
  at least one power output receptacle disposed in the outer body and electronically connected with the energy storage cell;
  an electromechanical switch electrically interconnected between the at least one rechargeable energy storage cell and the primary power output bus and at least one power output, and mechanically interconnected with the at least one deployable mechanical locking element;
  wherein the electromechanical switch has at least two switchable positions:
    a first switchable position in which the deployable mechanical locking element is withdrawn within the outer shell of the body and the electronic circuit between the rechargeable energy storage cell and both the primary output bus and the at least one power output receptacle is interrupted,
    a second switchable position in which the deployable mechanical locking element is extended out of the outer shell of the body and the electronic circuit between the rechargeable energy storage cell and both the primary output bus and the at least one power output receptacle is uninterrupted, and
  a primary power output bus interconnection circuit interconnected between the primary power output bus and the rechargeable energy storage cell such that when the primary output bus is engaged with the external electronic circuit the at least one low current output is connected through the external electronic circuit when the electromechanical switch is disposed in any one of the first or second switchable positions.

In other embodiments, the portable battery power supply may include an electromechanical switch with a third switchable position in which the deployable mechanical locking element may be extended out of the outer shell of the body and the electronic circuit between the rechargeable energy storage cell and both the primary output bus and the at least one power output receptacle is interrupted.

In still other embodiments the portable battery power supply may be configured to be removably disposed within a receiving housing having a cooperative electronic connection dock interconnected with the external electronic circuit.

In yet other embodiments the portable battery power supply may have a removable power inverter cap that has at least one power outlet and is configured to slidingly engage with the primary power output bus. In such embodiments, the electromechanical switch can be used to activate the power outlet receptacle when placed in the third switchable position.

Yet in still other embodiments the portable battery power supply the low current power output may be a USB connecter.

Yet even other embodiments the portable battery power supply may have a charge status indicator. In such embodiments, the indicator may be a backlit display.

Even still, other embodiments may have a recharging located within the outer shell of the body and designed to be connected to any high current output.

In other embodiments, the portable battery power supply may contain a handle to facilitate the removal, installation, and transportation of the power supply.

In still other embodiments the portable battery power supply may be associated with a portable electric vehicle. In such embodiments, the electric vehicle may have a housing designed to receive the portable battery power supply and be configured in such a way that when installed the battery power supply is securely fit with zero clearance between the walls of the housing and the battery power supply itself. I such embodiments the housing may contain alignment pins to assist with the installation and removal of the battery power supply when zero clearance exists. Additionally, such embodiments may allow for the battery power supply to act as an additional structural member by applying an outward force on the ends of the housing thereby adding additional strength to the electric vehicle.

In even other embodiments the portable electric vehicle may have fenestrations in the housing. In such embodiments, the fenestrations may allow for access to the switch. Additionally, such embodiments may allow for a viewing window for the status indicator or access to the power output receptacles.

Even still in some embodiments the portable electric vehicle may contain a low voltage power output receptacle that is connected to and electronic connection dock within a housing on the electric vehicle.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of the disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 4B provides a schematic view of the various electric circuits in accordance with embodiments of the invention.

DETAILED DESCRIPTION OF THE INVENTION

Turning now to the drawings, portable convertible rechargeable battery power supplies are described. In many embodiments, the battery power supplies generally comprise a casing enclosing one or more battery power cells and associated electronics and electrical interconnections. In various such embodiments the power cells are interconnected with a plurality of external ports allowing for at least one recharge input and at least two outputs: one configured for use with an electronic apparatus, such as a vehicle, and at least one configured for use with one or more personal electronic devices. In many such embodiments, the apparatus is an electric vehicle, and the battery power supply is configured to be secured within the electric vehicle. In various such embodiments the outputs for the personal electronic devices may include any suitable port, such as, for example, USB, mini-USB, USB-c, lightning, etc.

Figure 1A:
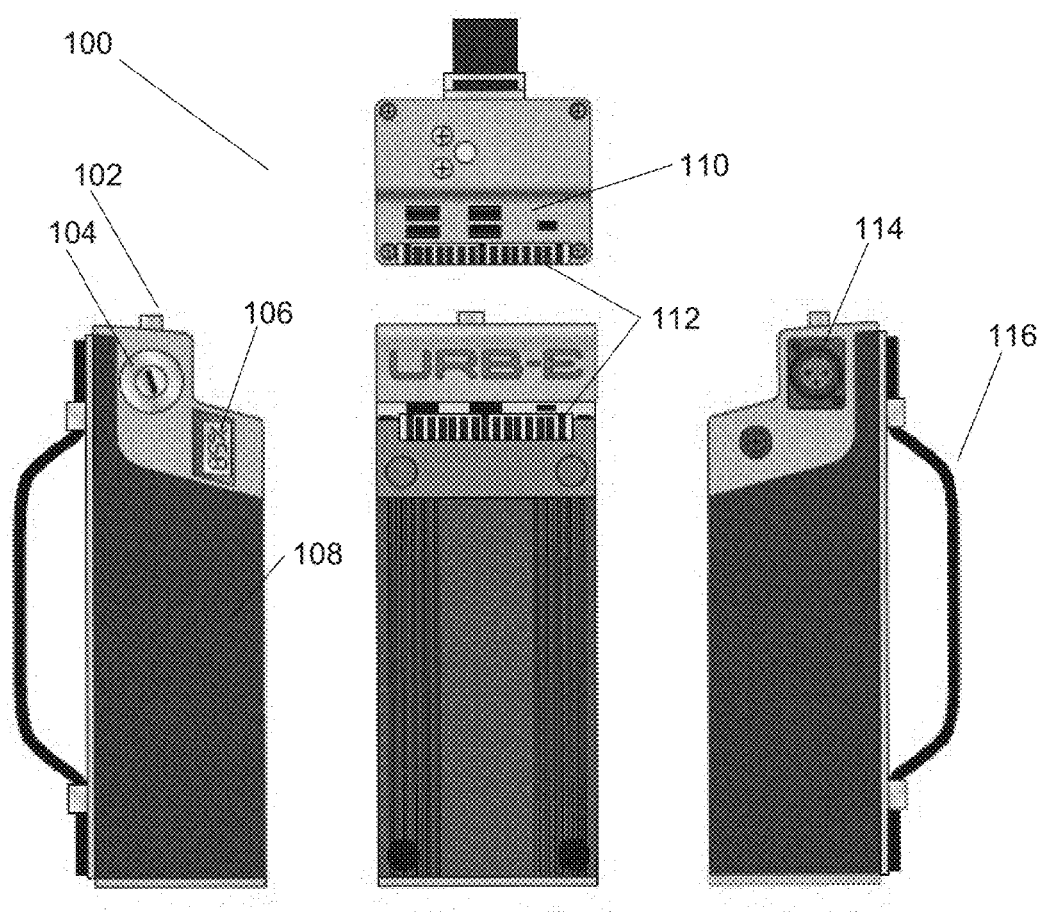
FIG. 1A provides various views of a portable rechargeable battery power supply in accordance with embodiments of the invention.
Figure 1B:
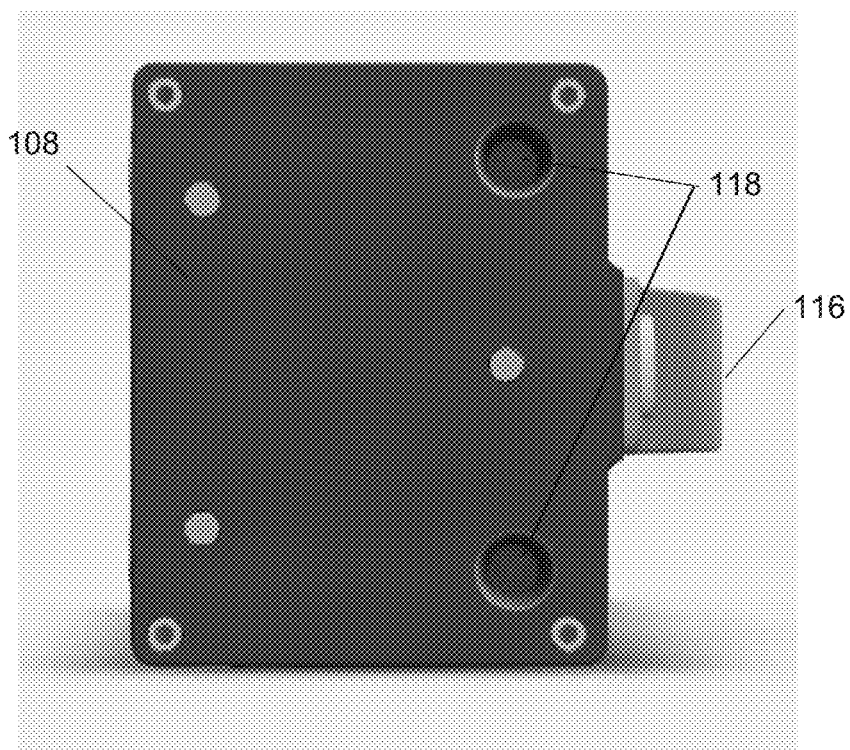
FIG. 1B provides a view of a bottom side of the portable rechargeable battery power supply in accordance with embodiments of the invention.

As shown in FIG. 1, in many embodiments a portable battery power supply (100) incorporates a body (108) that may take any configuration suitable for incorporation into a larger electric apparatus and include a power output bus (112) suitable for outputting power to said apparatus. In many embodiments, the device may include multiple other electric outlets (110), including USB, mini-USB, USB-c, lightning, etc. The portable battery power supply may include carrying handles (116), recharging ports (36), status indicators and electronic information screens (106), and securing elements (102) that may be mechanically connected to an activating mechanism (e.g., key) (104) for securing the battery within a larger framework or device. Although not shown in the figures, in some embodiments a portable battery power supply may include a power inverter cap that interfaces with the same electronic connection port (112) that interfaces with the larger electric apparatus.

Figure 2:
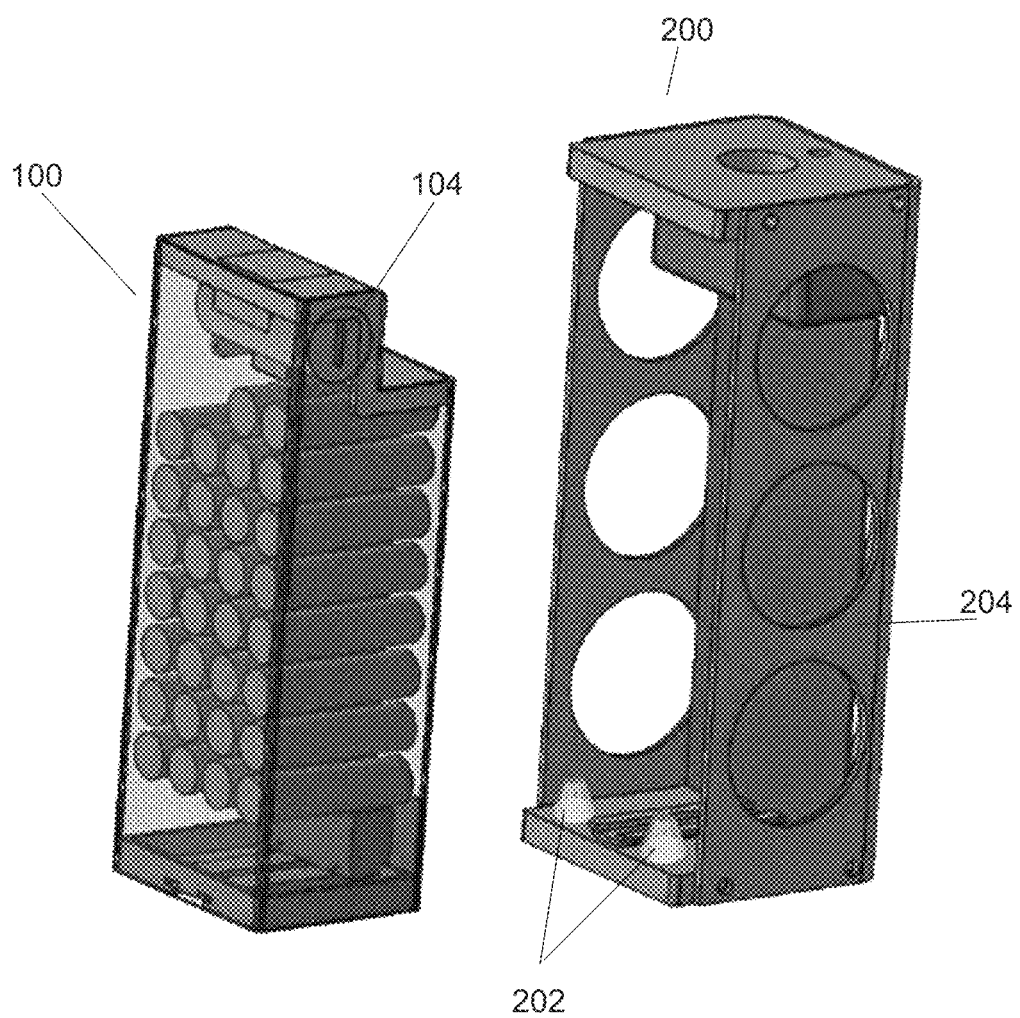
FIG. 2 provides component views of a portable rechargeable battery power supply in accordance with embodiments of the invention.

As shown, in FIG. 2, the battery power supply generally comprises a battery pack (100) configured to be housed within an enclosure (200) of an electric apparatus, the enclosure (200) formed by a rigid frame (204). Additionally, some embodiments may include a securing element (102) mechanically connected to an activating mechanism (104) that acts to deploy and redeploy the securing element through the switching of the activating mechanism. Although a specific arrangement of battery pack and apparatus enclosure are shown, it should be understood that any size and shape of battery pack and apparatus enclosure may be used such that the enclosure of the apparatus is configured to enclose and secure the battery pack therein, and wherein the battery pack may be mated with the relevant electronics interface of the apparatus.

Figure 3:
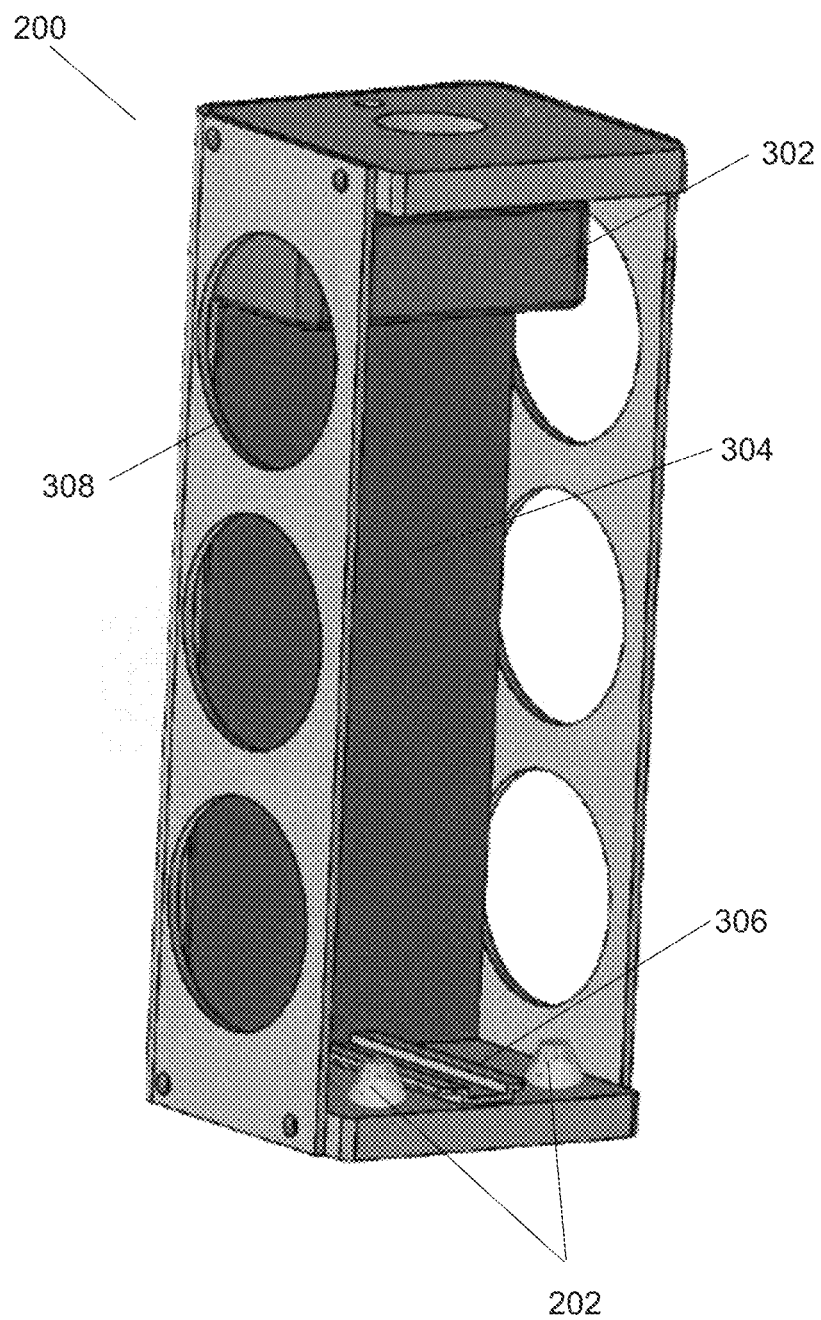
FIG. 3 provides a component view of a case for a portable rechargeable battery power supply in accordance with embodiments of the invention.

As shown in FIG. 3 an enclosure (200) may further include an engagement mechanism such as sliding mechanism (306) or a conical shaped element (202) for aligning and securing the battery pack within the apparatus enclosure (200). Additionally, in many embodiments the battery pack (100) may have a correlating element (118) in the body (108) of the battery pack (100) such that the correlating element will cooperate with the conical shaped element (202) of the enclosure (200). In various embodiments, the engagement mechanism comprises conical elements (202) in the enclosure (200) and cooperatively corresponding elements in the battery pack (100) such that the battery pack may be pivoted into the enclosure of the apparatus with minimal lateral clearance. Although the embodiments show the male conical engagement elements (202) being disposed in the enclosure and the female engagement elements (118) being disposed on the battery pack, it will be understood that these elements may be reversed without departing from the instant disclosure. Although sliding and conical alignment elements are shown in FIG. 3, it will be understood that many different alignment and securing mechanisms may be used to align and secure the battery within the enclosure.

In various embodiments, the apparatus enclosure (200) may include fenestrations (205) allowing for external access to portions of the battery pack (100), including the switch, status indicator and power output receptacle, etc. In other embodiments, the fenestrations are configured such that access to the power output receptacles on the battery pack is prevented while the battery pack is engaged within the apparatus enclosure.

Figure 6:
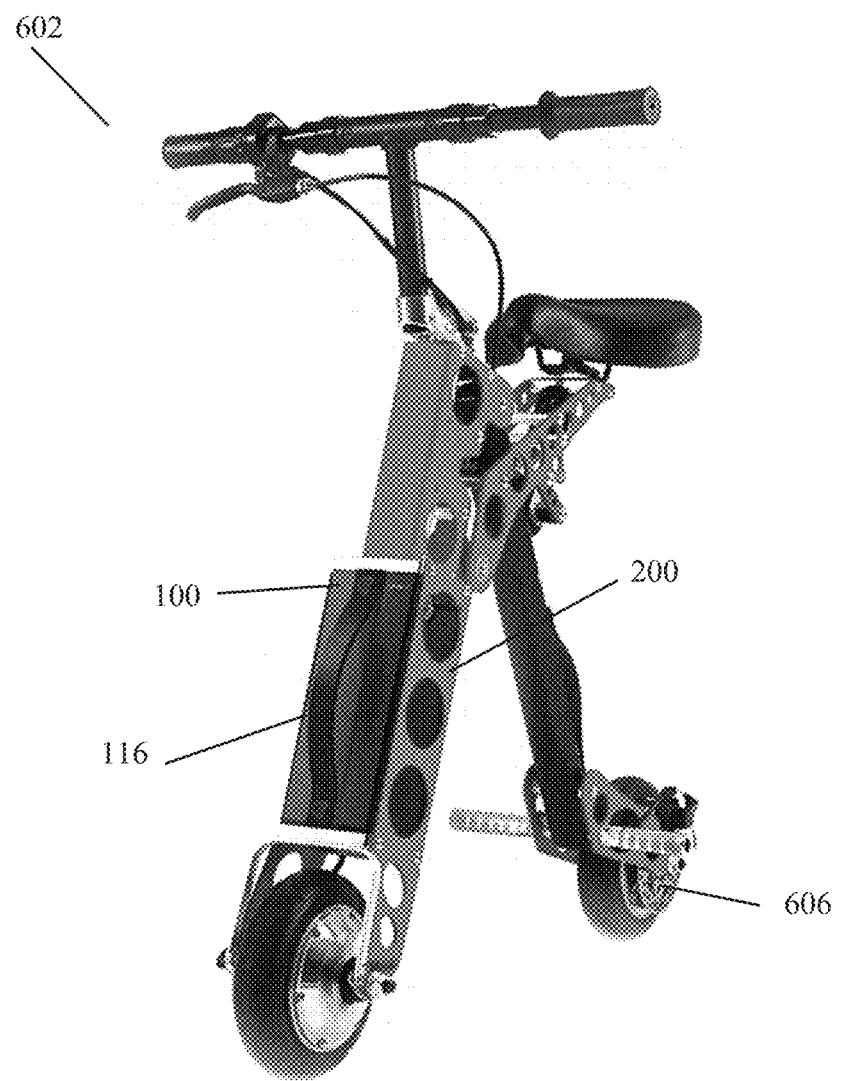
FIG. 6 provides a prospective view of an electronic vehicle containing a portable rechargeable battery power supply with embodiments of the invention.

Additionally, FIG. 3 portrays many embodiments where the apparatus enclosure may include a suitable electrical connection dock (302) and wiring harness (304) such that the power of the battery pack may be transmitted into the apparatus. In many embodiments, the apparatus may comprise an electric vehicle (602), such as a scooter as shown in FIG. 6, which requires suitable electrical power. In many embodiments, the vehicle may have an electric propulsion device (606) that is electronically connected to the electronic connection dock (302). Although, an electric scooter is shown in FIG. 6 it will be understood that many different electric apparatuses may be used in relation to the battery pack (100).

Figure 4A:
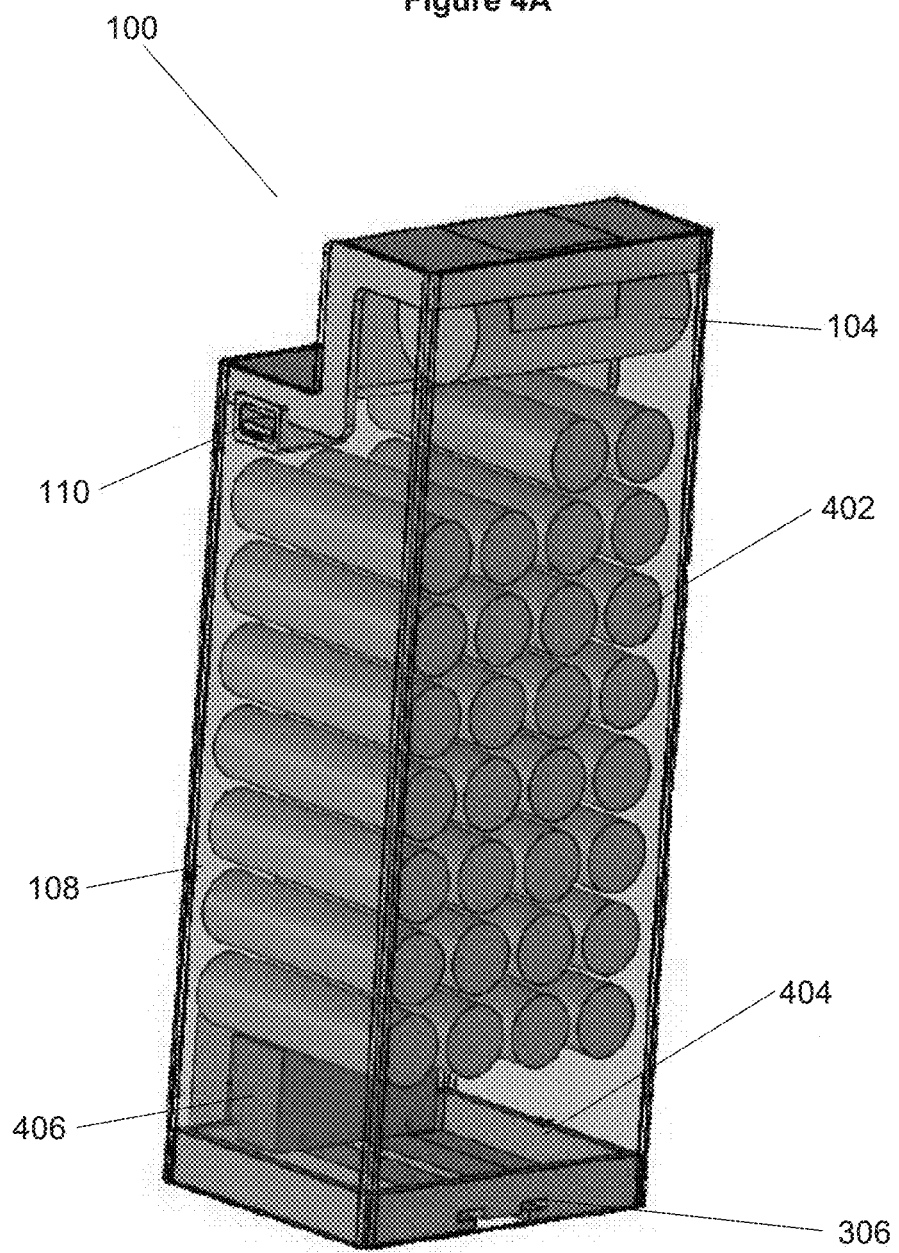
FIG. 4A provides a component view of a battery pack for a portable rechargeable battery power supply in accordance with embodiments of the invention.

As shown in FIG. 4A, the battery pack (100) generally comprises an outer case or body (108) defining an enclosure (404) into which are disposed one or more electrical power storage cells (402). Although a certain number and configuration of such cells are shown, it should be understood that any number, size or arrangement of such cells may be provided suitable for the provision of sufficient electrical power of suitable voltage and amperage.

In some embodiments as shown in FIGS. 1A, 2, and 4A, the battery pack (100) may contain a switching mechanism (104) that is connected to the energy storage cells (402) via an electrical circuit (408) as well as electrically connected to a power output bus (112). Additionally, the switching mechanism (104) may be mechanically connected to a securing element (102) therefore acting as an electromechanical switch.

Figure 4C:
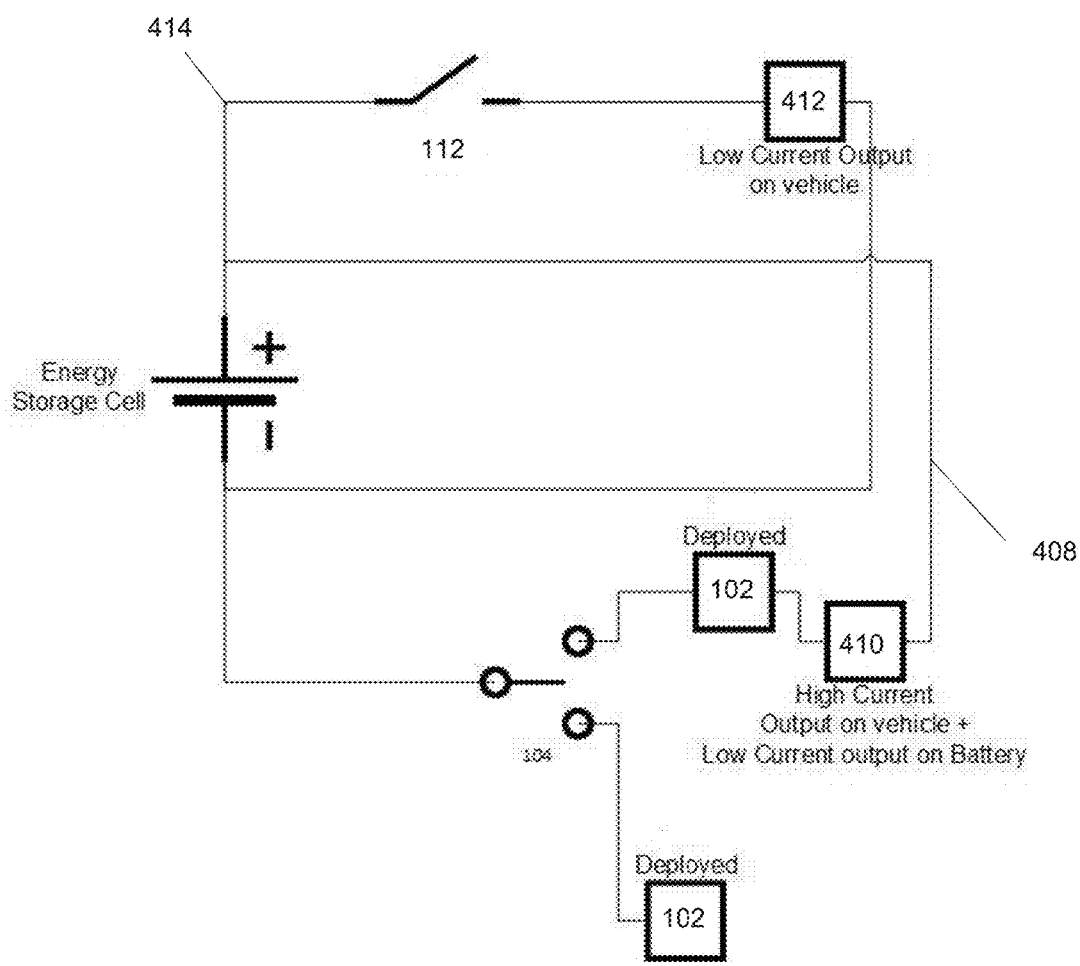
FIG. 4C provides a schematic view of various electric circuits in accordance with embodiments of the invention.

As shown in FIGS. 4B and 4C in many embodiments the switching mechanism (104) may be connected to the energy storage cells (402) via an electrical circuit (408) and may have multiple switchable positions. In some embodiments specifically shown in FIG. 4B the switching position may have two switching positions wherein the first position would leave one electrical circuit open while a second position may deploy the securing element (102) and simultaneously complete the electrical circuit (408) thereby generating power for the high current output and a low current output (410).

In some embodiments more specifically portrayed in FIG. 4C, the switching mechanism (104) may have three switchable positions. The first position and the second position may operate as previously described and the third position may operate to deploy the securing element (102) and leave open the electrical circuit (408).

Even still, in other embodiments, the energy cells (402) may be connected to a power output connection bus (112) via an electrical circuit (414) as shown in FIGS. 4B and 4C. In many embodiments, the electrical circuit (414) will be remain open until the power output connection bus (112) correlates with an electrical connection dock (302). The completion or closing of the electrical circuit (414) in some embodiments may transmit power from the energy storage cells to a low current output (412) independent of the position of the switch.

Returning now to FIG. 4A, the cells of the battery pack may be interconnected via wires and through a connector (406) such that the power from the cells may be recharged and output through a connection interface to a cooperative electrical apparatus (602), such as shown in FIGS. 2 and 3. In many embodiments the battery pack may contain a power recharging receptacle (114) in the body (108) of the battery pack (100) and electrically connected to the energy storage cells (402). Although a certain arrangement of such element is shown, it should be understood that any suitable arrangement can be provided such that the battery pack may cooperate with the electrical apparatus enclosure.

Additional power outputs (110) may also be provided. These outputs may be incorporated in any configuration, number and arrangement such that power from the battery pack may be provided to one or more personal electronic devices. Although a single USB port is shown, it should be understood that the output may include any suitable port, such as, for example, USB, mini-USB, USB-c, lightning, etc.

Although specific arrangements of circuits, switches and interconnections between components are shown, it will be understood that many other configurations may be contemplated such that the battery pack operates in a first mode in which at least a low current output is always active independent of the position of the switch while the battery pack is engaged within the enclosure of the powered device (e.g., electric scooter), and in a second mode in which no current is active until the switch is moved to an active position while the battery pack is disengaged from the enclosure of the powered device. These configurations thereby prevent there from being a constant drain on the battery pack from the accessory outlets while disengaged from the powered device, while simultaneously allowing for increased ease of use while engaged therein.

Figure 5:
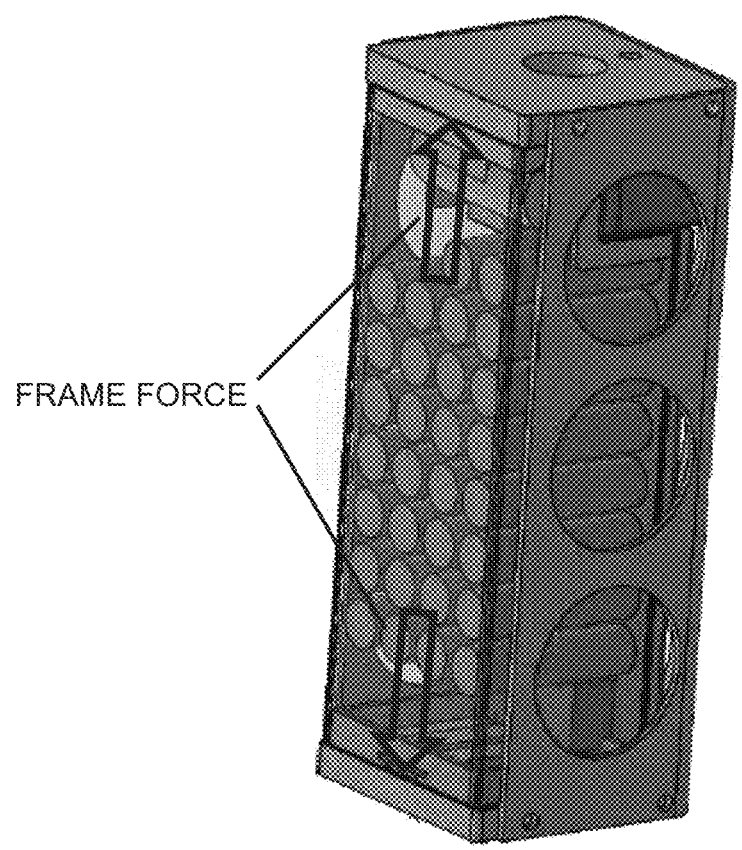
FIG. 5 provides an assembled view of a portable rechargeable battery power supply in accordance with embodiments of the invention.

As shown in FIG. 5, in many embodiments the battery pack (100) may comprise a rigid structure configured to transmit force through the frame (204) of the apparatus enclosure such that the battery pack serves as a secondary structural support for the powered device when engaged therewith.

Turning now to FIG. 6, in some embodiments the battery pack (100) may be located in an electric vehicle (602). In such embodiments, the battery pack may interconnect with a connector and circuitry in such vehicle to supply electrical energy to the electric motor (606) to propel the vehicle and to other systems and accessory outlets disposed within the body of the vehicle. In various embodiments, as described in greater detail in relation to FIGS. 4A to 4C, the vehicle connector and circuitry may be cooperatively configured with the battery pack such that certain elements (e.g., accessory outlets) of the vehicle are provided power in all switching configurations of the battery pack, while other elements (e.g., the motor) are only powered on when the switch is in a specific configuration. Additionally, the battery pack may have a carrying handle (116) for transporting, removing, or inserting the battery pack to the vehicle (602).

Figure 7A:
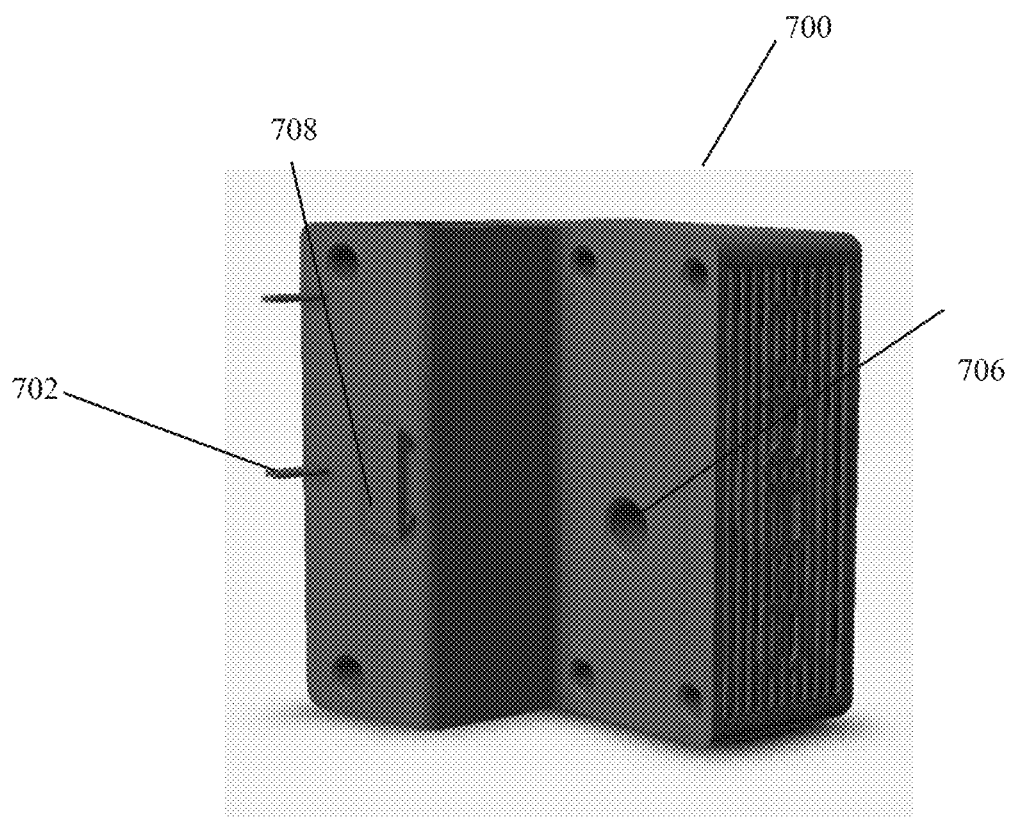
FIG. 7A provides a view of the power inverter cap for the rechargeable battery power supply.
Figure 7B:
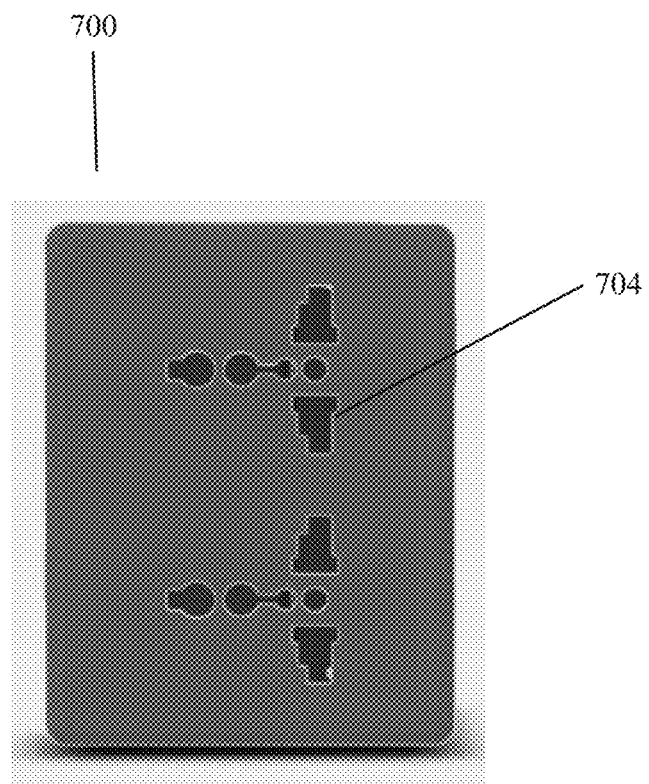
FIG. 7B provides a view of the power inverter cap for the rechargeable battery power supply showing the output receptacle.

As see in FIGS. 7A and 7B some embodiments may include a power inverter cap (700). In many embodiments, the power inverter cap (700) may slidingly engage with the battery back (100) and the power output connection bus (112). The power invert cap (700) may engage with the power output connection bus (112) through an external connector (702). In some embodiments the power inverter cap may contain at least one alignment element (706) that can cooperatively engage with the securing element (102) of the battery pack (100). Additionally, some embodiments may contain a second alignment element (708) that may slidingly engage with the battery pack (100).

As demonstrated in FIG. 7B, many embodiments of the power inverter cap may have a separate current output receptacle (704) whereby users may electronically connect and charge personal electronic devices. In some embodiments, the power inverter cap (700) and the enclosed current output receptacle (704) may be activated with the completion of the circuit (408) by way of the switching element (104). Although FIGS. 7A and 7B show a particular configuration of the power inverter cap (700) it should be known that any suitable arrangement can be provided.

DOCTRINE OF EQUIVALENTS

As can be inferred from the above discussion, the above-mentioned concepts can be implemented in a variety of arrangements in accordance with embodiments of the invention. For example, though the battery power supply has been described in relation to an electric vehicle, it will be understood that the supply could be adapted for use with other types of electric apparatus. Likewise, although the certain arrangements of power cells, outputs, inputs, case, etc., have been described other arrangements may be contemplated within the scope of the current disclosure.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A portable battery power supply comprising:
   a body having an outer shell defining an inner volume having at least one rechargeable energy storage cell disposed therein;
   a mechanical interconnection disposed in the outer shell of the body comprising at least one fixed mechanical engagement point and at least one deployable mechanical locking element;
   a primary power output bus disposed in the outer shell of the body and electronically connected with the at least one rechargeable energy storage cell, the primary power output bus being configured to cooperatively interconnect the portable battery power supply to an external electronic circuit to supply at least one high current output and at least one low current output thereto;
   at least one power output receptacle disposed in the outer body and electronically connected with the at least one rechargeable energy storage cell;
   an electromechanical switch electrically interconnected between the at least one rechargeable energy storage cell and the primary power output bus and at least one power output, and mechanically interconnected with the at least one deployable mechanical locking element;
   wherein the electromechanical switch has at least two switchable positions:
      a first switchable position in which the deployable mechanical locking element is withdrawn within the outer shell of the body and the electronic circuit between the rechargeable energy storage cell and both the primary output bus and the at least one power output receptacle is interrupted,
      a second switchable position in which the deployable mechanical locking element is extended out of the outer shell of the body and the electronic circuit between the rechargeable energy storage cell and both the primary output bus and the at least one power output receptacle is uninterrupted, and
   a primary power output bus interconnection circuit interconnected between the primary power output bus and the rechargeable energy storage cell such that when the primary output bus is engaged with the external electronic circuit the at least one low current output is connected through the external electronic circuit when the electromechanical switch is disposed in any one of the first or second switchable positions.

2. The portable battery power supply of claim 1 wherein the electromechanical switch has a third switchable position in which the deployable mechanical locking element is extended out of the outer shell of the body and the electronic circuit between the rechargeable energy storage cell and both the primary output bus and the at least one power output receptacle is interrupted.

3. The portable battery power supply of claim 1 wherein the body is configured to be removably disposed within a receiving housing having a cooperative electronic connection dock interconnected with the external electronic circuit.

4. The portable battery power supply of claim 2 further comprising a power inverter cap comprising at least one power outlet receptacle and configured to slidingly engage the primary power output bus, whereby the power outlet receptacle is activated when the electromechanical switch is disposed in the third switchable position.

5. The portable battery power supply of claim 1, wherein the at least one power output receptacle comprises at least one USB connector.

6. The portable battery power supply of claim 1, further comprising a charge status indicator disposed in the outer shell of the body and interconnected with the at least one rechargeable energy storage cell.

7. The portable battery power supply of claim 1, further comprising a recharging port disposed in the outer shell of the body and interconnected with the at least one rechargeable energy storage cell.

8. The portable battery power supply of claim 1, further comprising a carrying apparatus.

9. A portable electric vehicle comprising:
   a main body;
   an electronic propulsion device interconnected with the main body;
   a power supply receptacle interconnected with the main body and defining a cavity having inner walls and outer walls and a primary power input interconnection disposed within the cavity and electronically connected with said electronic propulsion device and at least one vehicle power receptacle disposed in the main body of the vehicle;
   at least a deployable lock engagement point disposed within the receptacle;
   at least a first alignment element disposed within the power supply receptacle; and
   a portable battery power supply comprising:
      a body having an outer shell defining an inner volume having at least one rechargeable energy storage cell disposed therein;
      a mechanical vehicle interconnection disposed in the outer shell of the body comprising at least one second alignment element configured to correlate with the at least first alignment structure and at least one deployable mechanical locking element configured to correlate with and engage the at least one deployable lock engagement point;
      a primary power output bus disposed in the outer shell of the body and electronically connected with the at least one rechargeable energy storage cell, the primary power output bus being configured to cooperatively interconnect the portable battery power supply to the primary power input interconnection and thereby completed the external electronic circuit to supply at least one high current output to the electronic propulsion device and at least one low current output to the at least one vehicle power receptacle;

at least one power output receptacle disposed in the outer body and electronically connected with the energy storage cell;

an electromechanical switch electrically interconnected between the at least one rechargeable energy storage cell and the primary power output bus and at least one power output, and mechanically interconnected with the at least one deployable mechanical locking element;

wherein the electromechanical switch has at least two switchable positions:
  a first switchable position in which the deployable mechanical locking element is withdrawn within the outer shell of the body and the electronic circuit between the rechargeable energy storage cell and both the primary output bus and the at least one power output receptacle is interrupted,
  a second switchable position in which the deployable mechanical locking element is extended out of the outer shell of the body and the electronic circuit between the rechargeable energy storage cell and both the primary output bus and the at least one power output receptacle is uninterrupted; and
  a primary power output bus interconnection circuit interconnected between the primary power output bus and the rechargeable energy storage cell such that when the primary output bus is engaged with the primary power input interconnection the at least one low current output is connected through the external electronic circuit when the electromechanical switch is disposed in any one of the two switchable positions.

10. The portable electric vehicle of claim 9 wherein the electromechanical switch of the portable battery power supply has a third switchable position in which the deployable mechanical locking element is extended out of the outer shell of the body and the electronic circuit between the rechargeable energy storage cell and both the primary output bus and the at least one power output receptacle is interrupted.

11. The portable electric vehicle of claim 9 wherein the portable battery power supply and the power supply receptacle are configured to cooperatively engage such that there is zero clearance between the body of the portable battery power supply and the inner walls of the power supply receptacle.

12. The portable electric vehicle of claim 9 wherein the portable battery power supply further comprises a power inverter cap comprising at least one power outlet receptacle and configured to slidingly engage the primary power output bus, whereby the power outlet receptacle is activated when the electromechanical switch is disposed in the second switchable position.

13. The portable electric vehicle of claim 9, wherein the at least one power output receptacle comprises at least one USB connector.

14. The portable electric vehicle of claim 9, further comprising a charge status indicator disposed in the outer shell of the body and interconnected with the at least one rechargeable energy storage cell.

15. The portable electric vehicle of claim 9, further comprising a recharging port disposed in the outer shell of the body and interconnected with the at least one rechargeable energy storage cell.

16. The portable electric vehicle of claim 9, further comprising a carrying apparatus.

17. The portable electric vehicle of claim 9 wherein the power supply receptacle further comprises at least one fenestration through the outer and inner walls thereby allowing access to the electromechanical switch.

18. The portable electric vehicle of claim 9 further comprising a low voltage power output receptacle disposed within the main body and electronically connected to the external electronic circuit of the portable battery power supply.

19. The portable electric vehicle of claim 17 wherein the electromechanical switch is in either the first or second positions and the low voltage power output is activated and the electronic circuit is uninterrupted when the portable battery power supply is disposed in the receptacle.

20. A portable electric vehicle comprising:
  a main body;
  an electronic propulsion devise interconnected with the main body;
  a power supply receptacle interconnected with the main body and defining a cavity having inner walls and outer walls and a primary power input interconnection dock disposed within the cavity and electronically connected with said electronic propulsion device;
  a portable rechargeable battery power supply removably disposed in the power supply receptacle; and
  at least one first conical alignment element axially disposed within the power supply receptacle and configured to cooperatively interconnect with a portable battery power supply having at least one second conical alignment element configured to cooperatively align with the first alignment element such that the portable battery power supply pivotably interconnects with the receptacle.

* * * * *